United States Patent
Barsukov et al.

(10) Patent No.: US 7,994,792 B2
(45) Date of Patent: Aug. 9, 2011

(54) ELECTRIC FIELD SENSOR FOR MARINE ENVIRONMENTS

(75) Inventors: Pavel Barsukov, Amersfoort (NL);
Bension Sh. Singer, Hafrsfjord (NO);
Eduard B. Fainberg, Amersfoort (NL)

(73) Assignee: Advanced Hydrocarbon Mapping AS, Stavanger (NO)

( * ) Notice: Subject to any disclaimer, the term of this patent is extended or adjusted under 35 U.S.C. 154(b) by 447 days.

(21) Appl. No.: 12/282,412

(22) PCT Filed: Mar. 12, 2007

(86) PCT No.: PCT/NO2007/000095
§ 371 (c)(1),
(2), (4) Date: Nov. 12, 2008

(87) PCT Pub. No.: WO2007/105956
PCT Pub. Date: Sep. 20, 2007

(65) Prior Publication Data
US 2009/0091329 A1 Apr. 9, 2009

(30) Foreign Application Priority Data
Mar. 15, 2006 (NO) .................................. 20061220

(51) Int. Cl.
*G01V 3/10* (2006.01)
(52) U.S. Cl. .................. 324/365; 324/332; 324/457
(58) Field of Classification Search .................. None
See application file for complete search history.

(56) References Cited

U.S. PATENT DOCUMENTS

| 3,641,427 A | 2/1972 | Pittman et al. |
| 3,662,260 A | 5/1972 | Thomas et al. |
| 3,738,164 A | 6/1973 | Sanford et al. |
| 4,207,568 A * | 6/1980 | MacLeod ...................... 340/852 |
| 2004/0000912 A1 | 1/2004 | Conti et al. |
| 2008/0035473 A1* | 2/2008 | Anastasijevic et al. ....... 204/242 |

FOREIGN PATENT DOCUMENTS
SU 917134 B 4/1982
* cited by examiner

*Primary Examiner* — Ha Tran T Nguyen
*Assistant Examiner* — Trung Q Nguyen
(74) *Attorney, Agent, or Firm* — GableGotwals

(57) ABSTRACT

A sensor (S) for marine measurements of an electric field, the sensor (S) including at least two electrodes (3, 4); signal transmission means (5) for transmitting measured signals from the sensor (S) to a signal processing (6); at least two closed containers (1, 2) which are formed of a non-conductive material and are filled with an electrolyte (E); at least two flexible hoses (7, 8) formed of an electrically non-conductive material; there being attached in a fluid-communicating manner to each of the containers at least one first hose end (7a, 8a), and a second hose end (7b, 8b) being open and attached to means (9a, 9b) for exact positioning of the second hose end (7b, 8b); the hoses (7, 8) being arranged to be filled with a medium (W) of the same type as that, in which the sensor (S) is arranged to be immersed in an operative condition; and two containers (1, 2) forming a pair of containers, the two containers (1, 2), relatively, being placed close to each other under approximately identical thermal, pressure and chemical conditions.

10 Claims, 3 Drawing Sheets

ELECTRIC FIELD SENSOR FOR MARINE ENVIRONMENTS

CROSS-REFERENCE TO PENDING APPLICATIONS

Figure 1:
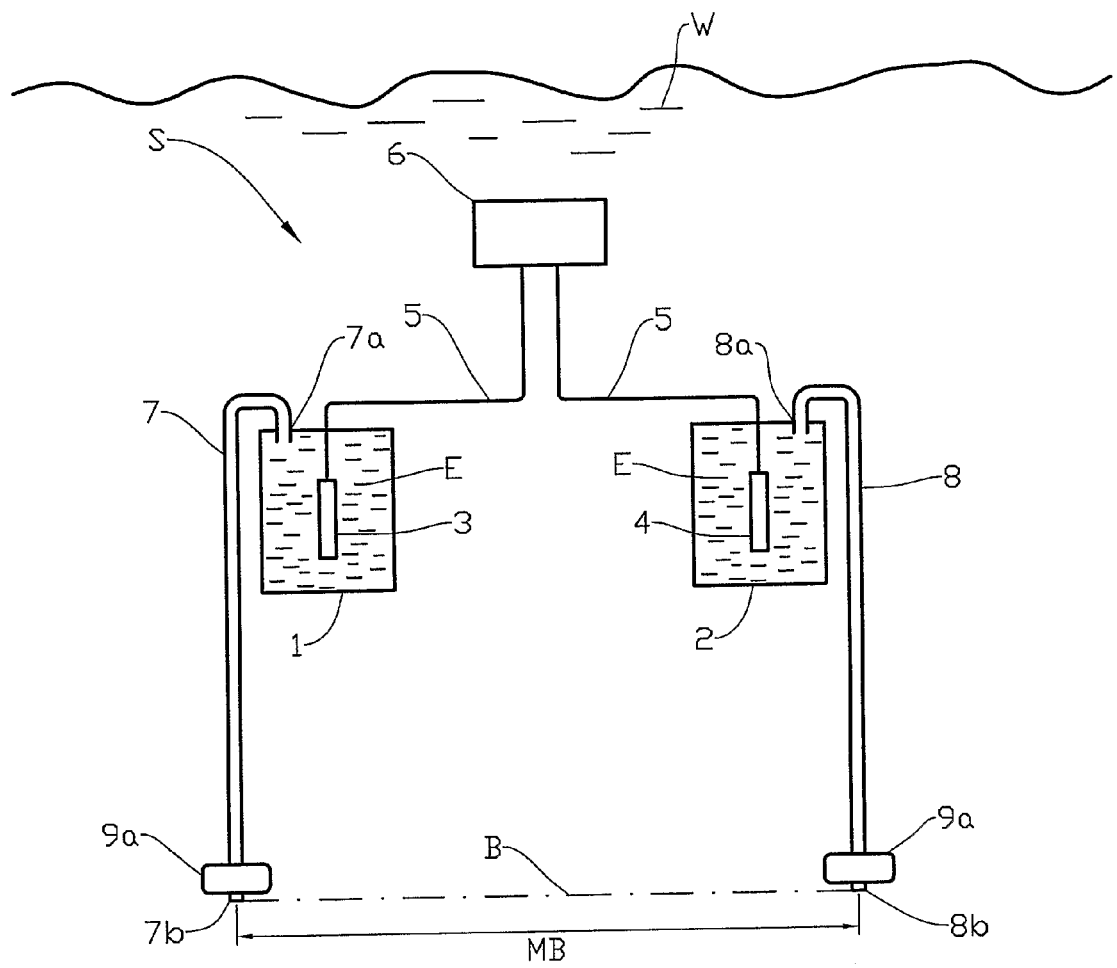

This application is based on PCT Patent Application No. NO2007/000095, filed on Mar. 12, 2007, which was based on Norwegian Patent Application No. 20061220, filed on Mar. 15, 2006.

The invention relates to a field sensor for marine environments, more particularly a field sensor which is provided with at least two containers, each encasing at least one electrode, being filled with an electrolyte and being in fluid communication with the surrounding water masses through flexible hoses, and the electrodes being connected to a signal processing unit.

Prior art comprises two main types of electric field sensors for normal use in marine electromagnetic exploration.

In sensors of the first type are used long isolated wires to connect Ag—AgCl, Pb—PbCl or other electrodes to a recording unit (e.g. Cox et al 1971; Filloux 1973; Webb et al. 1985). The interelectrode distance is usually large, typically in the order of 100-1000 meters. This type of electric field sensor can elevate the signal level way above the noise of the electrodes. In addition, large separation of electrodes makes it possible to average electric fields created by turbulence, waves and variations in temperature—salt concentration, these fields being in the order of just a few meters.

Because of the large separation of the electrodes they often work under different pressure and temperature conditions. This may lead to significant drift in the recorded signal.

The drift velocity is dependent on the composition and structure of the electrodes. Parameters affecting the drift in four types of electrodes are shown in Table 1.

TABLE 1

| | Noise | | | |
|---|---|---|---|---|
| Type | Ag-AgCl | Cd-CdCl | Pb-PbCl | Graphite manganese |
| Time drift, $\mu V/day$ | 0.6-6 | <100 | 1-10 | <30 |
| Pressure, $\mu V/bar$ | 8 | ? | 10-20 | 10-20 |
| Temperature, $\mu V/° K$ | <350 | 460 | 70-120 | 17 |

In sensors of the second type, the salt bridge type (Filloux 1974), electrodes are placed together inside an instrument case and connected to the sea water by means of isolated hoses which are only a few meters long. With a view to the fact that such sensors are often used for data acquisition from long period electric fields, a special device called a "chopper" is used to eliminate zero-point drift caused by variations in temperature and pressure.

Owing to the fact that the measurement base has a relatively short length, such sensors are less sensitive compared to the first sensor type. On the other hand they are characterized by greater stability and minimal drift in the measured signal.

The invention has as its object to remedy or reduce at least one of the drawbacks of the prior art.

The object is achieved through features which are specified in the description below and in the claims that follow.

The invention relates to a new type of sensor for measuring components of the electric field in marine environments. The sensor combines the main advantages of existing sensors as regards measurement sensitivity and stability against the influence of varying temperature, pressure, turbulence, waves and changes in salt concentration. For simplicity it does not necessarily include a "chopper", which may be used for long period measurements.

According to a first aspect of the invention the electric field sensor includes a pair of containers. The containers are closed with the exception of an outlet for a hose connected to each of the containers. The hoses are manufactured from an electrically non-conductive material. One end of the hose is connected in a fluid-communicating manner to the container, whereas the other end of the hose is open and connected to a positioning means in the form of, for example, ballast, typically an anchor, or a buoyancy body, typically a buoy. In an operative position the containers are placed next to each other and filled with an electrolyte. Both containers contain at least one electrode, preferably a Ag—AgCl electrode. The second, open end of the hose is placed in a desired position in the water masses relative to the respective container by means of the positioning means. The direction of a connecting line between the second, open ends of the two hoses indicates which component of the electric field is being measured; the distance between the ends defines the measurement base. The electrode is connected to a signal processing unit in a known manner.

According to a second aspect of the invention the containers are filled with an oversaturated electrolyte forming a chemically non-aggressive environment around the electrodes and preventing the ingress of water from the hose into the container.

According to a third aspect of the invention the sensor includes multiple pairs of containers with the corresponding hoses extending in different directions, the sensor being arranged to measure selectively several different field components.

According to a fourth aspect of the invention each of the containers is provided with multiple electrodes, different pairs of electrodes formed by one electrode in either one of the containers of the container pair being arranged to be used for independent recording of the same field components by means of a multichannel signal processing unit.

According to a fifth aspect of the invention the sensor is arranged for sequential or continuous comparison of the measurement stability of the electrodes.

According to the sixth aspect of the invention the signal processing unit is arranged to exclude a pair of electrodes which is faulty or unstable, after checking the collective measurements.

According to a seventh aspect of the invention the signal processing unit is arranged to average data acquired by means of different pairs of correctly functioning electrodes so as to improve the signal/noise ratio.

Figure 2:
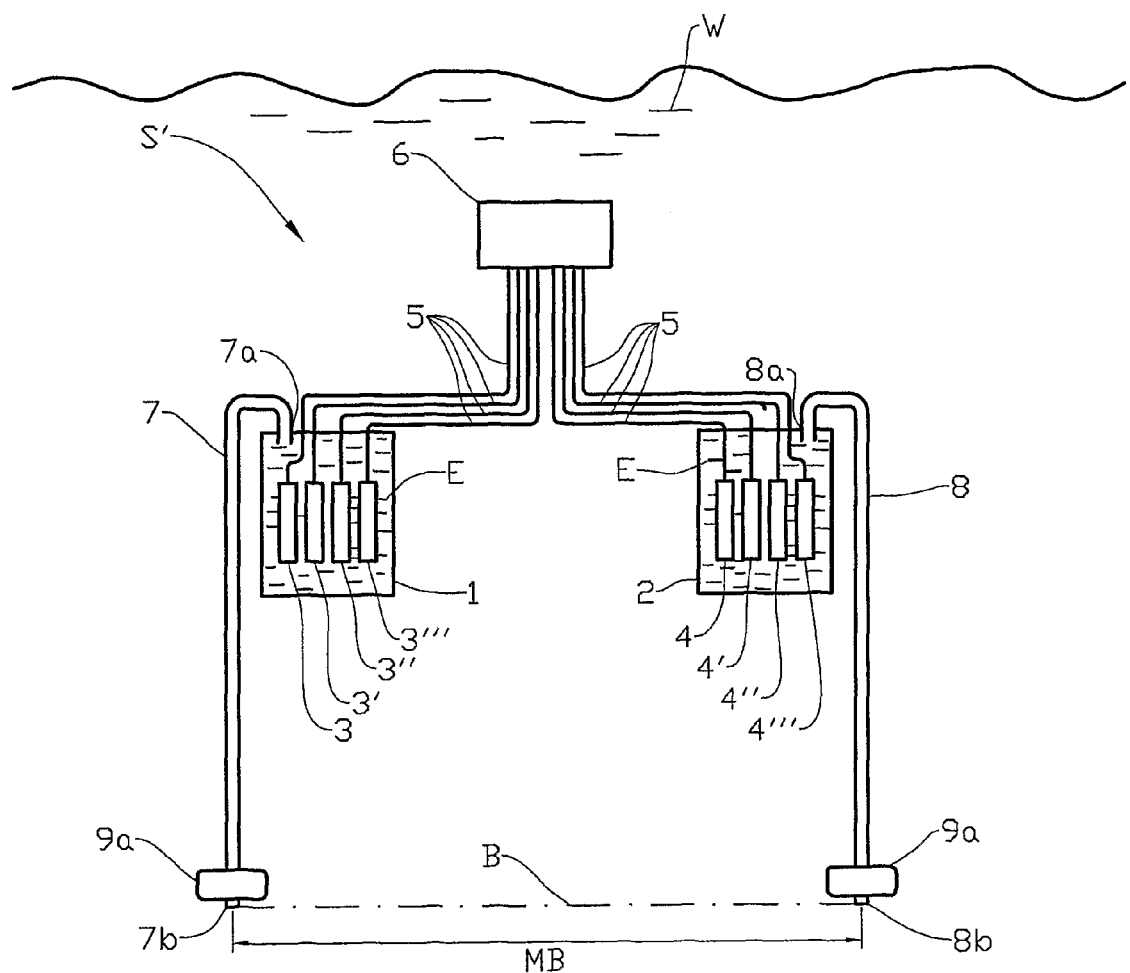
Figure 3:
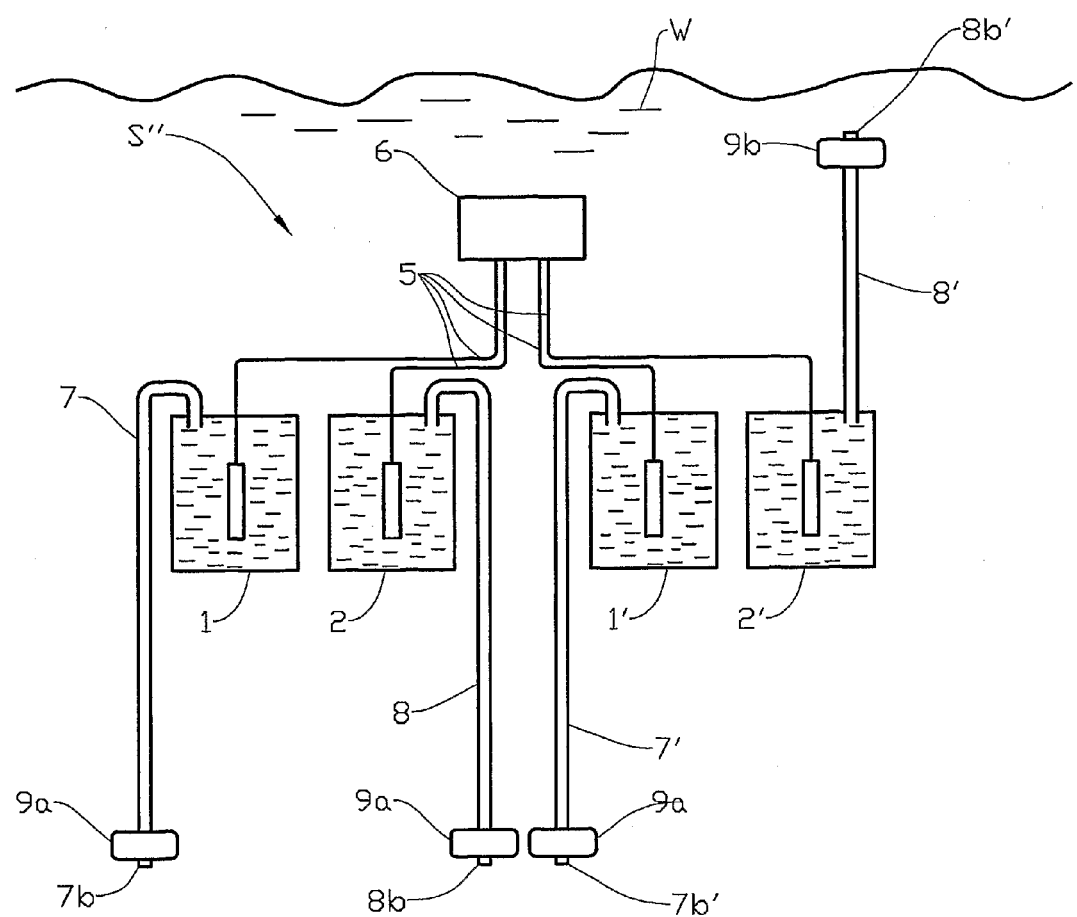

In what follows is described a non-limiting example of a preferred embodiment which is visualized in the accompanying drawings, in which:

FIG. 1 shows a principle drawing of a sensor according to the invention, the sensor being provided with one pair of electrodes and being oriented for measuring a horizontal field component;

FIG. 2 shows in a manner similar to that of FIG. 1 a principle drawing of a sensor according to the invention, but in which the sensor is provided with four pairs of electrodes; and FIG. 3 shows a principle drawing of a two-component sensor according to the invention, one part of the sensor being configured for measuring a horizontal component of the electric field and another part of the sensor being configured for measuring another horizontal or vertical component of the electric field.

In the figures the reference S indicates a sensor according to the invention, the sensor including two containers 1, 2 encasing electrodes 3, 4. The containers 1, 2 are immersed in a mass of water W. The electrodes 3, 4 are connected by means of cables 5 to a signal processing unit 6. The containers 1, 2 are formed of an electrically non-conductive material and are filled with an oversaturated electrolyte E. To each of the containers 1, 2 is connected in a fluid-communicating manner a first end 7a, 8a of a hose 7, 8 respectively. A second end 7b, 8b of the hose 7, 8 respectively is open to the surrounding masses of water W. The hoses are formed of a non-conductive material and are filled with sea water. The second ends 7b, 8b of the hoses 7, 8 are provided with means in the form of ballast 9a or a buoyancy body 9b (see FIG. 3) for positioning the second ends 7b, 8b relative to the containers 1, 2. The direction of a straight line B through the second ends 7b, 8b of the hoses 7, 8 determines which component of the electric field is being measured, and the distance MB between the ends 7b, 8b forms the measurement base.

FIG. 1 shows a sensor S according to the invention in its simplest embodiment.

FIG. 2 shows an example of a sensor S' characterized by improved stability and less electrode noise compared with the sensor S which is shown in FIG. 1. The improved features of the sensor S' are achieved by placing multiple electrodes 3, 3', 3", 3'" and 4, 4', 4", 4'" respectively in each container 1, 2 and by the signal processing unit 6 recording multiple channels.

FIG. 3 shows an electric two-component sensor S" consisting of four containers 1, 1', 2, 2' and four hoses 7, 7', 8, 8'. Depending on the relative distribution of the free ends 7b, 7b', 8b, 8b' of the hoses the sensor S' can provide simultaneous recording of either two horizontal or one horizontal and one vertical component(s) of the electric field. A corresponding structure can be used to measure the full vector of the electric field.

As mentioned above, known existing electric sensors may be divided into two separate groups.

Sensors of the first group utilize a large measurement base with electrodes placed at either end. Such sensors can provide a good signal/noise ratio because the signal amplitude is proportional to the length of the measurement base. The large measurement base also attenuates electric signals created by small-scale disturbances and heterogeneities. On the other hand, this type of sensor is prone to drift in the measured signal. To reduce the drift care is taken to select electrodes in pairs having close self-potentials and temperature and pressure coefficients. Nevertheless, the very design of these sensors implies that electrodes are placed at a significant distance from each other and therefore into quite different conditions. This applies to an even greater degree to the sensors used for measuring a vertical electric field. In this case, even two carefully selected electrodes will display major drift in the measured signal because they are placed at different depths and therefore in surroundings with different temperature and pressure conditions and salt concentrations.

In a salt bridge sensor the drift in the signal is greatly reduced by placing the electrodes close to each other and additionally using a "chopper". However, the low sensitivity of the sensor and its susceptibility to small-scale disturbances and heterogeneities place limitations on its application.

The proposed sensor which is shown in FIG. 1 combines the advantages of already existing sensors by making use of long hoses, that is to say a large measurement base, and close placement of electrodes. In practice, the close placement of electrodes will eliminate any drift caused by these sensitive elements (sensors) in the structure. The length of the hoses is determined by the desired signal/noise ratio and may vary from several meters to either several kilometers in the case of sensors for horizontal electric fields, or only being limited by the water depth in the case of sensors for vertical fields.

The advanced sensor S' in FIG. 2 utilizes four electrodes 3-3''', 4-4''' in each container 1, 2. The four-channel signal processing unit 6 performs synchronous measuring of electric fields by using different pairs of electrodes. The results from the measurements are analysed to, among other things, eliminate channels having unacceptable noise or instability, and the signals are subjected to further processing, including averaging or sophisticated filtration.

The invention claimed is:

1. A sensor for marine measurements of an electric field, said sensor comprising:
   a signal transmission means for transmitting a measured signal from said sensor to a signal processing unit;
   at least two closed containers formed of a non-conductive material, said containers containing an electrolyte and, each separately contain at least one electrode;
   at least two flexible hoses formed of an electrically non-conductive material;
   at least one first hose end in fluid-communication with each of said containers, and a second hose end being open and attached to a means for exact positioning of said second hose end;
   said hoses being arranged to be filled with a medium of the same type as that, in which said sensor is arranged to be immersed in an operative condition; and
   at least two containers, being placed close to each other under approximately identical thermal, pressure and chemical conditions.

2. The sensor according to claim 1, said electrodes comprising Ag—AgCl electrodes.

3. The sensor according to claim 1, said electrolyte comprising an oversaturated and a chemically non-aggressive environment around said electrodes.

4. The sensor according to claim 1, further comprising said first hose end in fluid communication with said container via a passage in an upper portion of said container.

5. The sensor according to claim 1, further comprising a measured field component determined by a direction of a straight line between said second hose ends and a pair of containers.

6. The sensor according to claim 1, further comprising said placement of said second hose ends varying randomly.

7. The sensor according to claim 1, said sensor comprising a pair of containers.

8. The sensor according to claim 1, said sensor comprising at least two pairs of containers, said electrodes of each pair of containers being connected in a signal-communicating manner to said signal processing unit via different channels for separate signal processing.

9. The sensor according to claim 1, each container comprising multiple electrodes arranged to measure the same field component independently.

10. The sensor according to claims 1, said signal transmission means comprising a means for interconnecting selected electrodes of particular properties.

* * * * *